United States Patent
Castanon et al.

(10) Patent No.: US 11,377,539 B2
(45) Date of Patent: Jul. 5, 2022

(54) CONJUGATED DIENE-BASED POLYMER, CONJUGATED DIENE-BASED POLYMER COMPOSITION, AND METHOD FOR PRODUCING CONJUGATED DIENE-BASED POLYMER

(71) Applicants: SUMITOMO CHEMICAL COMPANY, LIMITED, Tokyo (JP); ZS ELASTOMERS CO., LTD., Tokyo (JP)

(72) Inventors: Jesus Rodriguez Castanon, Ichihara (JP); Toshiro Matsuo, Kobe (JP); Masako Imai, Ichihara (JP); Yosuke Miyazaki, Ichihara (JP)

(73) Assignees: SUMITOMO CHEMICAL COMPANY, LIMITED, Tokyo (JP); ZS ELASTOMERS CO., LTD., Tokyo (JP)

( * ) Notice: Subject to any disclaimer, the term of this patent is extended or adjusted under 35 U.S.C. 154(b) by 149 days.

(21) Appl. No.: 16/275,472

(22) Filed: Feb. 14, 2019

(65) Prior Publication Data

US 2019/0256691 A1    Aug. 22, 2019

(30) Foreign Application Priority Data

Feb. 16, 2018   (JP) .............. JP2018-026189

(51) Int. Cl.
| | | |
|---|---|---|
| *C08L 9/00* | (2006.01) | |
| *C08F 236/06* | (2006.01) | |
| *C08L 7/00* | (2006.01) | |
| *B60C 1/00* | (2006.01) | |

(52) U.S. Cl.
CPC .............. *C08L 9/00* (2013.01); *C08F 236/06* (2013.01); *C08L 7/00* (2013.01); *B60C 1/0016* (2013.01); *C08F 2810/00* (2013.01); *C08L 2205/03* (2013.01); *C08L 2205/035* (2013.01)

(58) Field of Classification Search
CPC ......... C08C 19/22; C08C 19/25; C08C 19/44; C08L 9/00; C08L 7/00; C08L 9/06; C08L 2205/035; C08L 2205/03; B60C 1/00; B60C 1/0016; C08F 236/06; C08F 2810/00

See application file for complete search history.

(56) References Cited

U.S. PATENT DOCUMENTS

| | | | | |
|---|---|---|---|---|
| 5,500,482 A | * | 3/1996 | Muraki | ..................... C08L 7/00 525/232 |
| 9,249,276 B2 | | 2/2016 | Cho et al. | |
| 9,718,911 B2 | | 8/2017 | Cho et al. | |
| 2003/0008954 A1 | * | 1/2003 | Tadaki | ..................... C08L 9/02 524/261 |
| 2008/0319151 A1 | | 12/2008 | Oshima | |
| 2010/0016499 A1 | | 1/2010 | Oshima | |
| 2010/0056703 A1 | | 3/2010 | Oshima | |
| 2010/0108213 A1 | | 5/2010 | Miyazaki | |
| 2012/0252966 A1 | | 10/2012 | Ito | |
| 2014/0206793 A1 | * | 7/2014 | Okabe | .................. B60C 1/0016 523/156 |
| 2014/0296459 A1 | | 10/2014 | Tajima | |
| 2015/0183914 A1 | | 7/2015 | Kawai et al. | |
| 2016/0009903 A1 | | 1/2016 | Morita et al. | |
| 2016/0194484 A1 | * | 7/2016 | Mabuchi | ................... B60C 1/00 523/156 |
| 2016/0264601 A1 | * | 9/2016 | Rossle | ..................... C08L 9/06 |
| 2017/0137555 A1 | | 5/2017 | Sakurai et al. | |
| 2017/0369685 A1 | * | 12/2017 | Yamashiro | ............... C08K 5/18 |
| 2018/0066076 A1 | | 3/2018 | Kyo et al. | |
| 2018/0072102 A1 | | 3/2018 | Kato et al. | |
| 2018/0319960 A1 | * | 11/2018 | Saji | .......................... C08L 9/00 |

FOREIGN PATENT DOCUMENTS

| | | |
|---|---|---|
| JP | 2008239966 A | 10/2008 |
| JP | 200930027 A | 2/2009 |
| JP | 2010077413 A | 4/2010 |
| JP | 2010111753 A | 5/2010 |
| JP | 2012136586 A | 7/2012 |
| JP | 2012214711 A | 11/2012 |
| JP | 2014189720 A | 10/2014 |
| JP | 2015120785 A | 7/2015 |
| JP | 2016199707 A | 12/2016 |
| JP | 2017106029 A | 6/2017 |
| JP | 2017110230 A | 6/2017 |
| WO | 2014014052 A1 | 1/2014 |
| WO | 2014133096 A1 | 9/2014 |
| WO | 2015199226 A1 | 12/2015 |
| WO | 2016133154 A1 | 8/2016 |
| WO | WO-2017077712 A1 * | 5/2017 ............... B60C 1/00 |

* cited by examiner

*Primary Examiner* — Angela C Scott
(74) *Attorney, Agent, or Firm* — Sughrue Mion, PLLC

(57) ABSTRACT

The conjugated diene-based polymer of the invention comprises an aromatic vinyl unit based on an aromatic vinyl compound and a conjugated diene unit based on a conjugated diene compound, is modified with a compound containing a heteroatom, and has an SP value of 16.80 $\mathrm{MPa}^{1/2}$ to 17.10 $\mathrm{MPa}^{1/2}$.

13 Claims, No Drawings

CONJUGATED DIENE-BASED POLYMER, CONJUGATED DIENE-BASED POLYMER COMPOSITION, AND METHOD FOR PRODUCING CONJUGATED DIENE-BASED POLYMER

TECHNICAL FIELD

The present invention relates to a conjugated diene-based polymer, a conjugated diene-based polymer composition and a method for producing a conjugated diene-based polymer.

The present application claims priority based on Japanese Patent Application No. 2018-026189 filed on Feb. 16, 2018, the entire content of which is incorporated herein by reference.

BACKGROUND

Polymer compositions used in vehicle tires must have excellent processability while also exhibiting high elasticity, minimal reduction in breaking elongation and improved fatigue resistance. Examples of polymer compositions that are used for vehicle tires include polymer compositions containing conjugated diene-based polymers, such as polybutadiene and butadiene-styrene copolymer, and fillers such as carbon black and silica. JP 2012-136586 A, for example, describes a rubber composition having a high-polar thermoplastic polyester resin combined with a low-polar diene rubber compound, also in combination with a diene rubber compound having polarity midway between them, as a compatibilizer.

Studless tires, on the other hand, are required to excel in both on-ice performance and wear resistance. JP 2016-199707 A, for example, describes a rubber composition for studless tires comprising modified butadiene rubber, modified with a nitrone compound having a carboxy group, and thermally expandable microcapsules.

SUMMARY

When a conjugated diene-based polymer is stored, the shape of the polymer often undergoes deformative cold flow with the passage of time. A conjugated diene-based polymer used in a studless tire must therefore have excellent storage stability, in addition to improving the on-ice performance of the studless tire.

It is therefore an object of the present invention to provide a conjugated diene-based polymer that has excellent storage stability while additionally improving the on-ice performance of studless tires, as well as a method for producing it, and a conjugated diene-based polymer composition.

The invention relates to a conjugated diene-based polymer comprising an aromatic vinyl unit based on an aromatic vinyl compound and a conjugated diene unit based on a conjugated diene compound, the conjugated diene-based polymer being modified with a compound containing a heteroatom and having an SP value of 16.80 MPa$^{1/2}$ to 17.10 MPa$^{1/2}$.

The invention further relates to a conjugated diene-based polymer composition comprising a polymer component that includes the conjugated diene-based polymer and natural rubber, and a filler.

The invention still further relates to a method for producing the conjugated diene-based polymer, comprising a step of polymerizing a monomer including an aromatic vinyl compound and a conjugated diene compound in a hydrocarbon solvent in the presence of an alkali metal catalyst, to obtain a polymer, and a step of modifying the polymer with a compound containing a heteroatom.

The invention can provide a conjugated diene-based polymer that has excellent storage stability while additionally improving the on-ice performance of studless tires, as well as a method for producing it, and a conjugated diene-based polymer composition.

DETAILED DESCRIPTION

Embodiments of the invention will now be described in detail, with the understanding that they are not intended to be limitative on the invention.

The "SP value" referred to herein is also known as the solubility parameter, and experimentally determined SP values for different compounds may be found in published literature. The conjugated diene-based polymers used for the invention have different compositions, and therefore the SP values of the conjugated diene-based polymers referred to herein are those calculated from the published SP values for homopolymers of the aromatic vinyl compounds and homopolymers of the conjugated diene compounds, as the constituent components of the conjugated diene-based polymers, by applying methods for calculating SP values of mixtures. Homopolymers of aromatic vinyl compounds include polystyrene and poly(α-methylstyrene). Homopolymers of conjugated diene compounds include 1,4-polybutadiene, 1,2-polybutadiene, 1,4-polyisoprene, 1,2-polyisoprene and 3,4-polyisoprene. For the present specification, the same SP values are used for cis-1,4-polybutadiene and trans-1,4-polybutadiene.

The homopolymer SP values used for calculations in the present document are: SP values for 1,4-polybutadiene (92 wt %): 8.4(cal/mol$^3$)$^{0.5}$ (=17.18 MPa$^{1/2}$) and 1,2-polybutadiene (95 wt %): 8.1 (cal/mol$^3$)$^{0.5}$ (=16.57 MPa$^{1/2}$) which can be found in Macromolecules 2002, 35, 4030-4035, and the SP values for polystyrene: 19.28 MPa$^{1/2}$ and for natural rubber: 17.0 MPa$^{1/2}$ which can be found in J. Branderup, E. Immergut, E. Grulke, eds. "Polymer Handbook", 4th Ed., Wiley-Interscience, New York, 1999, Section VII, pp. 702-707.

The method used to calculate the SP value for a mixture was a generalization of the formulas 1 to 8 on page 3 of the Kansai University thesis: "Research on development of methods for evaluating solubility between substances using the Hansen solubility parameter, and their applications in chemical engineering" (Sato, T., Mar. 31, 2015) and can be expressed as follows:

$$\delta_{mix} = \Sigma(\varphi_i \times \delta_i)$$

Here, φ is the volume fraction in the mixture, $\varphi_i$ is the volume fraction of a component i, δ is the SP value, $\delta_{mix}$ is the SP value of the mixture, and $\delta_i$ is the SP value of component i.

The SP value of a conjugated diene-based polymer is determined by the following method. Specifically, if the structural unit (aromatic vinyl unit or conjugated diene unit) based on each monomer composing the conjugated diene-based polymer is represented as monomer unit i, then $\varphi_i$ as the volume fraction of monomer unit i and $\delta_i$ as the SP value of a homopolymer of monomer unit i are used to calculate $\delta_{mix}$, as the SP value of the conjugated diene-based polymer.

The volume fraction $\varphi_i$ can be calculated by the following formula.

$$\varphi_i = (x_i \times (1/Mn_i) \times Vm_i) / \Sigma(x_i \times (1/Mn_i) \times Vm_i)$$

Here, x is the weight percentage of each monomer unit, Mn is the molar mass (g/mol) of the monomer unit, and Vm is the molar volume (cm$^3$/mol) of the monomer unit.

The values used for the Mn and Vm of the monomer unit are as listed in "Materials Studio 2017R2 Synthia" by Dassault Systemes Biovia. The Mn of a styrene unit is 104.152 g/mol, the Mn of a cis- or trans-butadiene unit is 54.092 g/mol, and the Mn of a 1,2-butadiene unit is 54.092 g/mol. The Vm of a styrene unit is 96.975 cm$^3$/mol, the Vm of a cis- or trans-butadiene unit is 59.074 cm$^3$/mol, and the Vm of a 1,2-butadiene unit is 58.260 cm$^3$/mol.

The weight percentage of each monomer unit can be determined by dividing the content of each monomer unit by the total content for each of the monomer units of the conjugated diene-based polymer.

[Conjugated Diene-Based Polymer]

The conjugated diene-based polymer of this embodiment has an aromatic vinyl unit based on an aromatic vinyl compound and a conjugated diene unit based on a conjugated diene compound, and is modified by a compound containing a heteroatom. In other words, the conjugated diene-based polymer of this embodiment has a modified unit based on a compound containing a heteroatom.

From the viewpoint of compatibility with natural rubber, the SP value of the conjugated diene-based polymer of this embodiment may be 16.80 MPa$^{1/2}$ to 17.10 MPa$^{1/2}$, preferably 16.85 MPa$^{1/2}$ to 17.10 MPa$^{1/2}$, more preferably 16.88 MPa$^{1/2}$ to 17.08 MPa$^{1/2}$ and even more preferably 16.90 MPa$^{1/2}$ to 17.07 MPa$^{1/2}$.

For the preparation of the conjugated diene-based polymer of this embodiment, a polymer obtained by copolymerizing an aromatic vinyl compound and a conjugated diene compound in a hydrocarbon solvent in the presence of an alkali metal catalyst, may be modified with a compound containing a heteroatom. The components that may be used to prepare the modified conjugated diene-based polymer will now be described.

Examples of conjugated diene compounds include 1,3-butadiene, isoprene, 1,3-pentadiene, 2,3-dimethyl-1,3-butadiene and 1,3-hexadiene. The conjugated diene compound is preferably 1,3-butadiene. Conjugated dienes may be used alone or in combinations of two or more.

Examples of aromatic vinyl compounds include styrene, α-methylstyrene, vinyltoluene, vinylnaphthalene, divinylbenzene, trivinylbenzene and divinylnaphthalene. Styrene is a preferred aromatic vinyl compound. Aromatic vinyl compounds may be used alone or in combinations of two or more.

From the viewpoint of production cost, the amount of vinyl bonds of the conjugated diene-based polymer of this embodiment is preferably no greater than 80 mol %, more preferably no greater than 75 mol % and even more preferably no greater than 70 mol %, where 100 mol % is the content of the conjugated diene unit. From the viewpoint of industrial productivity, the amount of vinyl bonds is preferably 40 mol % or greater, more preferably 45 mol % or greater and even more preferably 50 mol % or greater. The amount of vinyl bonds can be determined as the vinyl bonds (mol %) of the conjugated diene based on $^1$H-NMR as according to JIS K6239(2007).

From the viewpoint of on-ice performance of a studless tire, the aromatic vinyl unit content of the conjugated diene-based polymer of this embodiment is preferably no greater than 10 mass % and more preferably no greater than 9 mass % of the total amount of the conjugated diene unit and aromatic vinyl unit. From the viewpoint of storage stability, the aromatic vinyl unit content is preferably 1 mass % or greater, more preferably 2 mass % or greater and even more preferably 4 mass % or greater.

The alkali metal catalyst used may be an alkali metal, an organic alkali metal compound, a complex of an alkali metal with a polar compound, or an oligomer with an alkali metal.

Examples of alkali metals include lithium, sodium, potassium, rubidium and cesium. Examples of organic alkali metal compounds include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide and potassium naphthalenide. Examples of complexes of alkali metals and polar compounds include potassium-tetrahydrofuran complex and potassium-di-ethoxyethane complex. Examples of oligomers with alkali metals include compounds obtained by reacting isoprene with 3-(dimethylamino)propyllithium or 3-(diethylamino) propyllithium, and sodium salts of α-methylstyrene tetramers. Organic lithium compounds and organic sodium compounds are preferred among these as alkali metal catalysts, with C2-20 organic lithium compounds and organic sodium compounds being more preferred. Such alkali metal catalysts may be used alone or in combinations of two or more.

The amount of organic alkali metal catalyst used is preferably 0.01 mmol to 15 mmol per 100 g as the total of the aromatic vinyl compound and the conjugated diene compound.

The hydrocarbon solvent is a solvent that does not inactivate the organic alkali metal catalyst, and an aliphatic hydrocarbon, aromatic hydrocarbon, alicyclic hydrocarbon or the like may be used. Examples of aliphatic hydrocarbons include propane, n-butane, iso-butane, n-pentane, iso-pentane, 2-methylpentane, 3-methylpentane, n-hexane, propene, 1-butene, iso-butene, trans-2-butene, cis-2-butene, 1-pentene, 2-pentene, 1-hexene and 2-hexene. Examples of aromatic hydrocarbons include benzene, toluene, xylene and ethylbenzene. Examples of alicyclic hydrocarbons include cyclopentane, methylcyclopentane and cyclohexane. C2-12 hydrocarbons are preferred among these. Such hydrocarbon solvents may be used alone or in combinations of two or more, and a mixture of an aliphatic hydrocarbon and an alicyclic hydrocarbon such as industrial hexane may also be used.

The method for producing the conjugated diene-based polymer according to this embodiment comprises step (1), which is a step of reacting a monomer including an aromatic vinyl compound and a conjugated diene compound in a hydrocarbon solvent in the presence of an alkali metal catalyst, to obtain a polymer, and step (2), which is a step of modifying the polymer with a compound containing a heteroatom.

In step (1), monomers including an aromatic vinyl compound and a conjugated diene compound are reacted in the presence of an alkali metal catalyst, to obtain a polymer having alkali metal catalyst-based active ends. In step (2), the active ends of the polymer obtained in step (1) are reacted with a compound containing a heteroatom, to introduce a modified unit based on a compound containing a heteroatom, at the ends of the polymer.

By modifying the conjugated diene-based polymer of this embodiment with a compound containing a heteroatom, it is possible to increase the dispersion of the filler that is added during the production of the conjugated diene-based polymer composition, as described below.

Examples of heteroatoms include oxygen atoms, nitrogen atoms, sulfur atoms and silicon atoms. Examples of compounds containing heteroatoms which may be used include one or more modifying agents selected from the group consisting of acrylamide compounds, vinylsilane compounds, alkoxysilane compounds, polysiloxane compounds, silane sulfide compounds, sulfanylsilane compounds, cyanate compounds and polyimine compounds.

Modifying agents to be used for this embodiment include the specific compounds disclosed in JP 2012-214711 A, JP 2008-239966 A, JP 2010-77413 A, JP 2014-189720 A, JP 2015-120785 A, JP 2017-106029 A, JP 2017-110230 A, WO 2014/133096 A1, WO 2014/014052 A1, WO 2015/199226 A1, WO 2016/133154 A1, U.S. Pat. Nos. 9,718,911 and 9,249,276.

When silica is to be added as a filler to the conjugated diene-based polymer composition, the conjugated diene-based polymer is preferably modified with a compound containing a silicon atom, from the viewpoint of increasing the silica dispersion, more preferably it is modified with an alkoxysilane compound or vinylsilane compound, and even more preferably it is modified with an alkoxysilane compound containing an amino group, or a vinylsilane compound containing an amino group.

Examples of alkoxysilane compounds containing amino groups include [3-(dimethylamino)propyl]trimethoxysilane, [3-(diethylamino)propyl]trimethoxysilane, [3-(dimethylamino)propyl]triethoxysilane, [3-(diethylamino)propyl]triethoxysilane, [3-(ethylmethylamino)propyl]trimethoxysilane, [3-(ethylmethylamino)propyl]triethoxysilane, [3-(dimethylamino)propyl]methyldimethoxysilane, [3-(diethylamino)propyl]methyldimethoxysilane, [3-(dimethylamino)propyl]ethyldimethoxysilane, [3-(diethylamino)propyl]ethyldimethoxysilane, [(3-methyl-3-ethylamino)propyl]methyldimethoxysilane, [(3-methyl-3-ethylamino)propyl]ethyldimethoxysilane, [3-(dimethylamino)propyl]methyldiethoxysilane, [3-(diethylamino)propyl]methyldiethoxysilane, [3-(dimethylamino)propyl]ethyldiethoxysilane, [3-(diethylamino)propyl]ethyldiethoxysilane, [3-(ethylmethylamino)propyl]methyldiethoxysilane, [3-(ethylmethylamino)propyl]ethyldiethoxysilane, [3-(benzylmethylamino)propyl]trimethoxysilane, [3-(benzylmethylamino)propyl]triethoxysilane, {3-[di(methoxymethyl)amino]propyl}trimethoxysilane, {3-[di(methoxyethyl)amino]propyl}trimethoxysilane, {3-[di(methoxymethyl)amino]propyl}triethoxysilane, {3-[di(methoxyethyl)amino]propyl}triethoxysilane, {3-[di(ethoxyethyl)amino]propyl}trimethoxysilane, {3-[di(ethoxymethyl)amino]propyl}trimethoxysilane, {3-[di(ethoxyethyl)amino]propyl}triethoxysilane, {3-[di(ethoxymethyl)amino]propyl}triethoxysilane, {3-[N,N-bis(trimethylsilyl)amino]propyl}trimethoxysilane, {3-[N,N-bis(trimethylsilyl)amino]propyl}triethoxysilane, {3-[N,N-bis(t-butyldimethylsilyl)amino]propyl}trimethoxysilane, {3-[N,N-bis(t-butyldimethylsilyl)amino]propyl}triethoxysilane, {3-[N,N-bis(trimethylsilyl)amino]propyl}methyldimethoxysilane, {3-[N,N-bis(trimethylsilyl)amino]propyl}methyldiethoxysilane, {3-[N,N-bis(t-butyldimethylsilyl)amino]propyl}methyldimethoxysilane, {3-[N,N-bis(t-butyldimethylsilyl)amino]propyl}methyldiethoxysilane, [3-(ethylmethylamino)propyl]trimethoxysilane, [3-(ethylmethylamino)propyl]triethoxysilane, [3-(ethylmethylamino)propyl]methyldimethoxysilane, [3-(ethylmethylamino)propyl]ethyldimethoxysilane, [3-(ethylmethylamino)propyl]methyldiethoxysilane and [3-(ethylmethylamino)propyl]ethyldiethoxysilane. Among these it is preferred to use [3-(dimethylamino)propyl]trimethoxysilane, [3-(diethylamino)propyl]trimethoxysilane, [3-(dimethylamino)propyl]triethoxysilane or [3-(diethylamino)propyl]triethoxysilane.

Examples of vinylsilane compounds containing amino groups include bis(dimethylamino)methylvinylsilane, bis(diethylamino)methylvinylsilane, bis(di(n-propyl)amino)methylvinylsilane, bis(di(n-butyl)amino)methylvinylsilane, bis(dimethylamino)ethylvinylsilane, bis(diethylamino)ethylvinylsilane, bis(dipropylamino)ethylvinylsilane and bis(dibutylamino)ethylvinylsilane.

Polymerization of the aromatic vinyl compound and conjugated diene compound may be carried out in the presence of an agent for adjustment of the amount of vinyl bonds in the conjugated diene unit, or an agent for adjustment of the distribution of the conjugated diene unit and aromatic vinyl unit in the polymer chain (hereunder referred to collectively as "adjustor").

The adjustor used may be a polar compound such as an ether compound, tertiary amine, phosphine compound, alkali metal alkoxide or alkali metal phenoxide. Examples of ether compounds include cyclic ethers such as tetrahydrofuran, tetrahydropyran and 1,4-dioxane; aliphatic monoethers such as diethyl ether and dibutyl ether; aliphatic diethers such as ethyleneglycol dimethyl ether, ethyleneglycol diethyl ether and ethyleneglycol dibutyl ether; aliphatic triethers such as diethyleneglycol diethyl ether and diethyleneglycol dibutyl ether; and aromatic ethers such as diphenyl ether, anisole, 1,2-dimethoxybenzene and 3,4-dimethoxytoluene. Examples of tertiary amines include triethylamine, tripropylamine, tributylamine, 1,1,2,2-tetramethylethylenediamine, N,N-diethylaniline, pyridine and quinoline. Examples of phosphine compounds include trimethylphosphine, triethylphosphine and triphenylphosphine. Examples of alkali metal alkoxides include sodium tert-butoxide, potassium tert-butoxide, sodium tert-pentoxide and potassium tert-pentoxide. Examples of alkali metal phenoxides include sodium phenoxide and potassium phenoxide. Any of these compounds may be used alone or in combinations of two or more.

From the viewpoint of strength, the Mooney viscosity ($ML_{1+4}$) of the conjugated diene-based polymer of this embodiment is preferably 10 or greater, more preferably 20 or greater, even more preferably 30 or greater and most preferably 35 or greater. From the viewpoint of processability, it is preferably no greater than 200, more preferably no greater than 150, even more preferably no greater than 100 and most preferably no greater than 80. The Mooney viscosity ($ML_{1+4}$) is measured at 100° C., according to JIS K6300(1994).

From the viewpoint of fuel efficiency, the weight-average molecular weight (Mw) of the conjugated diene-based polymer of this embodiment is preferably 150,000 or higher, more preferably 150,000 to 1,500,000, even more preferably 250,000 to 1,000,000 and most preferably 250,000 to 800,000. The Mw is the value measured by gel permeation chromatography (GPC) and recorded in terms of standard polystyrene.

From the viewpoint of improving the on-ice performance, the glass transition temperature (Tg) of the conjugated diene-based polymer of this embodiment is preferably −80 to −25° C., more preferably −70 to −30° C. and even more preferably −50 to −35° C. The Tg can be measured by differential scanning calorimetry (DSC) according to JIS K6240.

The storage stability of the conjugated diene-based polymer can be evaluated by a cold flow test. Here, "cold flow" refers to the phenomenon whereby the shape of a conjugated diene-based polymer collapses with time when it is stored. A lower degree of cold flow is advantageous from the viewpoint of storage stability. Throughout the present specification, a cold flow test was carried out by preparing a cylindrical test piece of the conjugated diene-based polymer and storing the test piece in an oven at 40° C. after measuring its height. The storage stability can be evaluated by measuring the height of the test piece after 1 day at 40° C., and determining the height retention using the following formula. A larger numerical value for the height retention may be judged as superior storage stability. From the viewpoint of excellent storage stability, the height retention of the conjugated diene-based polymer for this embodiment is preferably 60% or greater, more preferably 70% or greater, even more preferably 75% or greater and most preferably 80% or greater.

Height retention (%)=(height of test piece after 1 day/height of test piece before test)×100

[Conjugated Diene-Based Polymer Composition]

The conjugated diene-based polymer composition of this embodiment comprises a polymer component that includes the conjugated diene-based polymer (also referred to below as "conjugated diene-based polymer A") and natural rubber, and a filler.

From the viewpoint of improving the on-ice performance, the conjugated diene-based polymer A content in the polymer composition is preferably 1 to 90 parts by mass, more preferably 5 to 80 parts by mass and even more preferably 10 to 60 parts by mass, where 100 parts by mass is the total amount of the conjugated diene-based polymer A and natural rubber.

From the viewpoint of improving the on-ice performance, the natural rubber content in the polymer composition is preferably 10 to 99 parts by mass, more preferably 20 to 95 parts by mass and even more preferably 40 to 90 parts by mass, where 100 parts by mass is the total amount of the conjugated diene-based polymer A and natural rubber.

The conjugated diene-based polymer composition may also contain a polymer component other than the conjugated diene-based polymer A and natural rubber (hereunder referred to as "other polymer component").

Examples for the other polymer component include conventional styrene-butadiene copolymer rubber, butadiene rubber, butadiene-isoprene copolymer rubber, butyl rubber, ethylene-propylene copolymer and ethylene-octene copolymer. These polymer components may be used alone or in combinations of two or more.

The conjugated diene-based polymer composition may further contain high-cis-butadiene rubber as the other polymer component, from the viewpoint of obtaining excellent wear resistance. High-cis-butadiene rubber is polybutadiene having 95% or higher cis-1,4-bonds.

The high-cis-butadiene rubber content in the polymer composition, from the viewpoint of improving the on-ice performance, is preferably 10 to 100 parts by mass, more preferably 20 to 95 parts by mass and even more preferably 30 to 90 parts by mass, where 100 parts by mass is the total amount of the conjugated diene-based polymer A and natural rubber.

From the viewpoint of improving the on-ice performance, the conjugated diene-based polymer composition may still further contain, as another polymer component, a conjugated diene-based polymer having an SP value greater than 17.10 $MPa^{1/2}$ and up to 17.30 $MPa^{1/2}$ (hereunder also referred to as "conjugated diene-based polymer B"). The SP value of the conjugated diene-based polymer B may be 17.11 $MPa^{1/2}$ to 17.25 $MPa^{1/2}$ or 17.11 $MPa^{1/2}$ to 17.20 $MPa^{1/2}$.

From the viewpoint of the balance between on-ice performance and wear resistance, the conjugated diene-based polymer B content in the polymer composition is preferably no greater than 80 parts by mass, more preferably no greater than 60 parts by mass and even more preferably 10 to 60 parts by mass, with respect to 100 parts by mass as the total amount of the conjugated diene-based polymer A and natural rubber.

From the viewpoint of obtaining superior on-ice performance and wear resistance, the conjugated diene-based polymer composition most preferably contains the conjugated diene-based polymer A, natural rubber, high-cis-butadiene rubber and conjugated diene-based polymer B. The composition is preferably 1 to 90 parts by mass of the conjugated diene-based polymer A, 10 to 99 parts by mass of the natural rubber and 10 to 100 parts by mass of the high-cis-butadiene rubber with respect to 100 parts by mass as the total amount of the conjugated diene-based polymer A and natural rubber, and 1 to 90 parts by mass of the conjugated diene-based polymer B with respect to 100 parts by mass as the total amount of the conjugated diene-based polymer B and high-cis-butadiene rubber, more preferably 5 to 80 parts by mass of the conjugated diene-based polymer A, 20 to 95 parts by mass of the natural rubber and 20 to 95 parts by mass of the high-cis-butadiene rubber, and 5 to 80 parts by mass of the conjugated diene-based polymer B with respect to 100 parts by mass as the total amount of the conjugated diene-based polymer B and high-cis-butadiene rubber, and even more preferably 10 to 60 parts by mass of the conjugated diene-based polymer A, 40 to 90 parts by mass of the natural rubber and 30 to 90 parts by mass of the high-cis-butadiene rubber, and 10 to 60 parts by mass of the conjugated diene-based polymer B with respect to 100 parts by mass as the total amount of the conjugated diene-based polymer B and high-cis-butadiene rubber.

From the viewpoint of improving the on-ice performance, the filler content of the polymer composition is preferably 30 to 100 parts by mass, more preferably 35 to 90 parts by mass, even more preferably 40 to 80 parts by mass and most preferably 45 to 70 parts by mass, with respect to 100 parts by mass of the polymer component.

Examples of fillers include silica, calcium silicate, aluminum silicate, carbon black, calcium carbonate, talc, aluminum hydroxide, alumina, clay and mica. These may be used alone or in combinations of two or more.

From the viewpoint of further improving the on-ice performance, silica is preferably added as a filler. Examples of silica include dry silica (silicic anhydride), wet silica (hydrous silicic acid), colloidal silica and precipitated silica. The BET specific surface area of the silica will generally be 50 to 250 $m^2/g$, and different types of silica may be used, either alone or in combinations of two or more.

The BET specific surface area can be measured according to ASTM D1993-03. Commercial silica products that may be used include products with the trade names "Ultrasil VN3" and "Ultrasil 7000 GR" by Evonik Co., the trade names "NIPSIL VN3", "NIPSIL AQ", "NIPSIL ER" and "NIPSIL RS-150" by Tosoh Silica Corp., and the trade names "Zeosil 1115 MP" and "Zeosil 1165 MP" by Solvay Co.

Examples of carbon blacks include furnace black, acetylene black, thermal black, channel black and graphite. Examples of channel black include EPC, MPC and CC. Examples of furnace carbon black include SAF, ISAF, HAF, MAF, FEF, SRF, GPF, APF, FF, CF, SCF and ECF. Examples of thermal black include FT and MT. Different types of carbon black may be used alone or in combinations of two or more.

The nitrogen adsorption specific surface area (NSA) of the carbon black will generally be 5 to 200 $m^2/g$, and the dibutyl phthalate (DBP) absorption of the carbon black will generally be 5 to 300 mL/100 g. The nitrogen adsorption specific surface area can be measured according to ASTM D4820-93, and the DBP absorbed dose can be measured according to ASTM D2414-93. Commercially available products of carbon black include products with the trade names "SEAST 6", "SEAST 7HM" and "SEAST KH" by Tokai Carbon Co., Ltd., and products with the trade names "CK 3" and "Special Black 4A" by Evonik Co.

Various additives may also be combined with the conjugated diene-based polymer composition. Publicly known additives may be used, including vulcanizing agents such as sulfur; vulcanization accelerators such as thiazole-based vulcanization accelerators, thiuram-based vulcanization accelerators, sulfenamide-based vulcanization accelerators and guanidine-based vulcanization accelerators; vulcanizing activators such as stearic acid and zinc oxide; organic peroxides; silane coupling agents; extender oils; processing aids; aging inhibitors; and lubricants.

Examples of silane coupling agents include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropylmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide and γ-trimethoxysilylpropylbenzothiazyl tetrasulfide. These silane coupling agents may be used alone or in combinations of two or more. Commercially available products include "Si69" and "Si75", trade names of Evonik Co.

Examples of extender oils include aromatic-based mineral oils (viscosity gravity constant (V.G.C.) value: 0.900 to 1.049), naphthene-based mineral oils (V.G.C. value: 0.850 to 0.899) and paraffinic mineral oils (V.G.C. value: 0.790 to 0.849). The polycyclic aromatic content of the extender oil is preferably less than 3 mass % and more preferably less than 1 mass %. The polycyclic aromatic content is measured according to British Petroleum Institute method 346/92. The aromatic compound content (CA) of the extender oil is preferably 20 mass % or greater. Extender oils may also be used alone or in combinations of two or more.

Examples of vulcanization accelerators include thiazole-based vulcanization accelerators such as 2-mercaptobenzothiazole, dibenzothiazyldisulfide and N-cyclohexyl-2-benzothiazyl sulfenamide; thiuram-based vulcanization accelerators such as tetramethylthiuram monosulfide and tetramethylthiuram disulfide; sulfenamide-based vulcanization accelerators such as N-cyclohexyl-2-benzothiazole sulfenamide, N-t-butyl-2-benzothiazole sulfenamide, N-oxyethylene-2-benzothiazole sulfenamide, N-oxyethylene-2-benzothiazole sulfenamide and N,N'-diisopropyl-2-benzothiazole sulfenamide; and guanidine-based vulcanization accelerators such as diphenylguanidine, diorthotolylguanidine and ortho-tolylbiguanidine. The vulcanization accelerator content is preferably 0.1 to 5 parts by mass and more preferably 0.2 to 3 parts by mass with respect to 100 parts by mass of the polymer component.

The method used to produce the conjugated diene-based polymer composition of this embodiment may be one that is publicly known, such as kneading of the components with a roll or a known type of mixer such as a Banbury mixer.

When a vulcanizing agent and vulcanization accelerator are not added, the kneading conditions may be a kneading temperature of generally 50 to 200° C. and preferably 80 to 190° C., and the kneading time will usually be 30 seconds to 30 minutes and preferably 1 minute to 30 minutes. When a vulcanizing agent or vulcanization accelerator is added, the kneading temperature will usually be no higher than 100° C. and preferably room temperature to 80° C. The composition with a vulcanizing agent or vulcanization accelerator added is usually used after vulcanizing treatment by press vulcanization or the like. The curing temperature will usually be 120 to 200° C., and is preferably 140 to 180° C.

A vulcanized sheet formed from a conjugated diene-based polymer composition comprising a vulcanizing agent or vulcanization accelerator may be used for measurement of the storage elastic modulus (E') at −20° C. with a viscoelasticity meter, to evaluate the on-ice performance. A smaller E' value at −20° C. means that the vulcanized sheet has more excellent low-temperature characteristics, and superior on-ice performance.

The conjugated diene-based polymer composition of this embodiment can provide effective on-ice performance when employed in a studless tire.

EXAMPLES

The present invention will now be explained in greater detail through the following examples, with the understanding that these examples are in no way limitative on the invention. The following methods were used to evaluate the physical properties.

1. Mooney Viscosity ($ML_{1+4}$)

The Mooney viscosity of the conjugated diene-based polymer was measured at 100° C. according to JIS K6300 (1994).

2. Styrene Unit Content and Vinyl Bond Amount

The styrene unit content (mass %) of the conjugated diene-based polymer and the amount of vinyl bonds (mol %) of the conjugated diene were determined from $^1$H-NMR according to JIS K6239(2007).

3. Weight-Average Molecular Weight (Mw)

The Mw of the conjugated diene-based polymer was measured by gel permeation chromatography (GPC) under the following conditions (1) to (8).
(1) Apparatus: "HLC-8020" by Tosoh Corp.
(2) Separating column: "GMH-XL" (two in series), by Tosoh Corp.
(3) Measuring temperature: 40° C.
(4) Carrier: Tetrahydrofuran
(5) Flow rate: 0.6 mL/min
(6) Injection rate: 5 μL
(7) Detector: Differential refractometer
(8) Molecular weight reference: Standard polystyrene 4. Glass Transition Temperature (Tg)

The Tg of the conjugated diene-based polymer was measured with a differential thermal analysis device ("DSC7020" by SII NanoTechnology Inc.), according to JIS K6240. First, 10 mg of the dried conjugated diene-based polymer as a measuring sample was placed in an aluminum pan, using an empty aluminum pan as the reference, and the DSC curve was measured with a temperature-elevating rate of 10° C./min within a measuring temperature range of −140° C. to 50° C. Next, the temperature at the endothermic peak of the differential signal (DDSC) during the temperature elevation was determined, and was recorded as the glass transition temperature (Tg) of the conjugated diene-based polymer.

5. Storage Stability

The conjugated diene-based polymer was press molded at 100° C. for 20 minutes, to fabricate a cylindrical test piece having a diameter of 29 mm and a height of 25 mm. The test piece was stored in an oven at 40° C., and the height of the test piece after 1 day was measured, to determine the height retention. A larger numerical value for the height retention corresponds to superior storage stability.

6. Low-Temperature Performance

A 1 mm- or 2 mm-wide, 40 mm-long test piece punched from a vulcanized sheet was provided for testing. A viscoelasticity meter (product of Ueshima Seisakusho Co., Ltd.) was used to measure the storage elastic modulus (E') of the test piece at a temperature of −20° C., under conditions with a frequency of 10 Hz, an initial elongation of 10% and a distortion amplitude of 2.5%. A smaller E value corresponds to superior low-temperature performance (on-ice performance).

<Fabrication of Conjugated Diene-Based Polymer>

Synthesis Example A 1

(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of industrial hexane (Sumitomo Chemical Co., Ltd., trade name: Hexane (common name), density: 0.68 g/mL), 855 g of 1,3-butadiene, 45 g of styrene, 9.1 mL of tetrahydrofuran and 0.8 mL of ethyleneglycol diethyl ether were loaded in. For preliminary detoxification of the impurities with the potential to inactivate the polymerization initiator, a hexane solution containing a small amount of n-butyllithium (n-BuLi) was loaded into the polymerization reactor as a scavenger, after which an n-hexane solution containing 12.5 mmol n-BuLi was loaded in and polymerization was initiated. Copolymerization of 1,3-butadiene and styrene was carried out for 2.3 hours. During the polymerization, the stirring speed was 130 rpm, the temperature in the polymerization reactor was 65° C., and 1045 g of 1,3-butadiene and 55 g of styrene were continuously supplied. The obtained polymerization solution was then stirred at a speed of 130 rpm in the polymerization reactor while maintaining a reactor temperature of 65° C.

(Step 2)

After step 1, while maintaining a polymerization reactor temperature of 65° C., the obtained polymer solution was stirred at a speed of 130 rpm, 12.5 mmol of [3-(diethylamino)propyl]trimethoxysilane was added as a modifying agent to the polymerization solution, and stirring was continued for 15 minutes. After loading 5 mL of a hexane solution containing 0.8 mL of methanol into the polymerization reactor, the polymer solution was stirred for 5 minutes. After adding 8.0 g of 2-tert-butyl-6-(3-tert-butyl-2-hydroxy-5-methylbenzyl)-4-methylphenyl acrylate (product of Sumitomo Chemical Co., Ltd., trade name: SUMILIZER® GM) and 4.0 g of pentaerythritol tetrakis (3-dodecylthiopropionate) (product of Sumitomo Chemical Co., Ltd., trade name: SUMILIZER® TP-D) into the polymerization reactor, most of the volatile components in the polymer solution were vaporized off at ordinary temperature for 24 hours, and then reduced pressure drying was carried out at 55° C. for 12 hours to obtain conjugated diene-based polymer A1.

Synthesis Example A2

(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of industrial hexane, 855 g of 1,3-butadiene, 45 g of styrene, 6.1 mL of tetrahydrofuran and 5.5 mL of ethyleneglycol diethyl ether were loaded into the polymerization reactor. After loading a small amount of an n-BuLi hexane solution as a scavenger into the polymerization reactor, an n-hexane solution containing 16.5 mmol of n-BuLi was loaded and polymerization was initiated. Copolymerization of 1,3-butadiene and styrene was carried out for 2.0 hours. During the polymerization, the stirring speed was 130 rpm, the temperature in the polymerization reactor was 65° C., and 1045 g of 1,3-butadiene and 55 g of styrene were continuously supplied. Next, while maintaining a polymerization reactor temperature of 65° C., the polymerization solution was stirred in the polymerization reactor at a stirring speed of 130 rpm, 1.73 mmol of silicon tetrachloride was added, and stirring was continued for 15 minutes.

(Step 2)

After step 1, while maintaining a polymerization reactor temperature of 65° C., the polymer solution was stirred at a speed of 130 rpm, 7.66 mmol of [3-(diethylamino)propyl] trimethoxysilane was added as a modifying agent to the polymerization solution, and stirring was continued for 15 minutes.

(Step 3)

After step 2, while maintaining a polymerization reactor temperature of 65° C., the polymerization solution was stirred in the polymerization reactor at a stirring speed of 130 rpm, an n-hexane solution containing 11.5 mmol of n-BuLi was added, and stirring was continued for 15 minutes. After loading 5 mL of a hexane solution containing 1.7 mL of methanol into the polymerization reactor, the polymer solution was stirred for 5 minutes. Next, 8.0 g of "SUMILIZER GM" and 4.0 g of "SUMILIZER TP-D" were added, after which most of the volatile components in the polymer solution were vaporized off at ordinary temperature for 24 hours, and reduced pressure drying was carried out at 55° C. for 12 hours to obtain conjugated diene-based polymer A2.

Synthesis Example A3

(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of industrial hexane, 814 g of 1,3-butadiene, 86 g of styrene, 9.1 mL of tetrahydrofuran and 1.8 mL of ethyleneglycol diethyl ether were loaded into the polymerization reactor. After loading a small amount of an n-BuLi hexane solution as a scavenger, an n-hexane solution containing 12.5 mmol of n-BuLi was loaded and polymerization was initiated. Copolymerization of 1,3-butadiene and styrene was carried out for 2.3 hours. During the polymerization, the stirring speed was 130 rpm, the temperature in the polymerization reactor was 65° C., and 994 g of 1,3-butadiene and 106 g of styrene were continuously supplied. The resulting polymerization solution was then stirred at a speed of 130 rpm in the polymerization reactor while maintaining a reactor temperature of 65° C.

(Step 2)

After step 1, while maintaining a polymerization reactor temperature of 65° C., the polymer solution was stirred at a speed of 130 rpm, 12.5 mmol of [3-(diethylamino)propyl]trimethoxysilane was added as a modifying agent, and stirring was continued for 15 minutes. After loading 5 mL of a hexane solution containing 0.8 mL of methanol into the polymerization reactor, the polymer solution was stirred for 5 minutes. Next, 8.0 g of "SUMILIZER GM" and 4.0 g of "SUMILIZER TP-D" were added, after which most of the volatile components in the polymer solution were vaporized off at ordinary temperature for 24 hours, and reduced pressure drying was carried out at 55° C. for 12 hours to obtain conjugated diene-based polymer A3.

Synthesis Example B1

(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of industrial hexane, 720 g of 1,3-butadiene, 80 g of styrene, 6.1 mL of tetrahydrofuran and 1.2 mL of ethyleneglycol diethyl ether were loaded into the polymerization reactor. After loading a small amount of an n-BuLi hexane solution as a scavenger, an n-hexane solution containing 14.29 mmol of n-BuLi was loaded into the polymerization reactor and polymerization was initiated. Copolymerization of 1,3-butadiene and styrene was carried out for 2.0 hours. During the polymerization, the stirring speed was 130 rpm, the temperature in the polymerization reactor was 65° C., and 1080 g of 1,3-butadiene and 120 g of styrene were continuously supplied. Next, while maintaining a polymerization reactor temperature of 65° C., the polymerization solution was stirred in the polymerization reactor at a stirring speed of 130 rpm, 1.07 mmol of silicon tetrachloride was added, and stirring was continued for 15 minutes.

(Step 2)

After step 1, while maintaining a polymerization reactor temperature of 65° C., the obtained polymer solution was stirred at a speed of 130 rpm, 15.01 mmol of [3-(diethylamino)propyl]trimethoxysilane was added as a modifying agent, and stirring was continued for 15 minutes.

(Step 3)

After step 2, while maintaining a polymerization reactor temperature of 65° C., the obtained polymerization solution was stirred at a speed of 130 rpm, an n-hexane solution containing 22.52 mmol of n-BuLi was added, and stirring was continued for 15 minutes. After loading 5 mL of a hexane solution containing 2.3 mL of methanol into the polymerization reactor, the polymer solution was stirred for 5 minutes. Next, 8.0 g of "SUMILIZER GM" and 4.0 g of "SUMILIZER TP-D" were loaded into the polymerization reactor, after which most of the volatile components in the polymer solution were vaporized off at ordinary temperature for 24 hours, and reduced pressure drying was carried out at 55° C. for 12 hours to obtain conjugated diene-based polymer B1.

Synthesis Example B2

(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of industrial hexane, 900 g of 1,3-butadiene, 100 g of styrene, 8.3 mL of tetrahydrofuran and 1.5 mL of ethyleneglycol dibutyl ether were loaded into the polymerization reactor. After loading a small amount of an n-BuLi hexane solution as a scavenger, an n-hexane solution containing 12.5 mmol of n-BuLi was loaded in and polymerization was initiated. Copolymerization of 1,3-butadiene and styrene was carried out for 2.3 hours. During the polymerization, the stirring speed was 130 rpm, the temperature in the polymerization reactor was 65° C., and 900 g of 1,3-butadiene and 100 g of styrene were continuously supplied. The polymerization solution was then stirred at a speed of 130 rpm in the polymerization reactor while maintaining a reactor temperature of 65° C.

(Step 2)

After step 1, while maintaining a polymerization reactor temperature of 65° C., the obtained polymer solution was stirred at a speed of 130 rpm, 12.5 mmol of [3-(diethylamino)propyl]trimethoxysilane was added as a modifying agent to the polymerization solution, and stirring was continued for 15 minutes. After loading 5 mL of a hexane solution containing 0.8 mL of methanol into the polymerization reactor, the polymer solution was stirred for 5 minutes. Next, 8.0 g of "SUMILIZER GM" and 4.0 g of "SUMILIZER TP-D" were added, after which most of the volatile components in the polymer solution were vaporized off at ordinary temperature for 24 hours, and reduced pressure drying was carried out at 55° C. for 12 hours to obtain conjugated diene-based polymer B2.

Synthesis Example C1

(Step 1)

A stirrer-mounted stainless steel polymerization reactor with an internal volume of 30 L was washed and dried, and the atmosphere in the interior of the polymerization reactor was exchanged with dry nitrogen. Next, 15.3 kg of industrial hexane, 976 g of 1,3-butadiene, 526 g of styrene, 10.3 mL of tetrahydrofuran and 5.5 mL of ethyleneglycol diethyl ether were loaded in. After loading a small amount of an n-BuLi hexane solution as a scavenger into the polymerization reactor, an n-hexane solution containing 19.13 mmol of n-BuLi was loaded and polymerization was initiated. Copolymerization of 1,3-butadiene and styrene was carried out for 2.7 hours. During the polymerization, the stirring speed was 160 rpm, the temperature in the polymerization reactor was 65° C., and 1274 g of 1,3-butadiene and 224 g of styrene were continuously supplied. Next, while maintaining a polymerization reactor temperature of 65° C., the polymerization solution was stirred in the polymerization reactor at a stirring speed of 130 rpm, 1.67 mmol of silicon tetrachloride was added to the polymerization solution, and stirring was continued for 15 minutes.

(Step 2)

After step 1, while maintaining a polymerization reactor temperature of 65° C., the polymer solution was stirred at a speed of 160 rpm, 18.65 mmol of [3-(diethylamino)propyl]trimethoxysilane was added as a modifying agent to the polymerization solution, and stirring was continued for 15 minutes.

(Step 3)

After step 2, while maintaining a polymerization reactor temperature of 65° C., the obtained polymerization solution was stirred at a stirring speed of 160 rpm, an n-hexane solution containing 27.98 mmol of n-BuLi was added, and stirring was continued for 15 minutes. After loading 5 mL of a hexane solution containing 2.9 mL of methanol into the polymerization reactor, the polymer solution was stirred for 5 minutes. Next, 12.0 g of "SUMILIZER GM" and 6.0 g of "SUMILIZER TP-D" were loaded, after which most of the volatile components in the polymer solution were vaporized off at ordinary temperature for 24 hours, and reduced pressure drying was carried out at 55° C. for 12 hours to obtain conjugated diene-based polymer C1.

Synthesis Example C2

(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of industrial hexane, 520 g of 1,3-butadiene, 6.1 mL of tetrahydrofuran and 0.4 mL of ethyleneglycol diethyl ether were loaded in. After loading a small amount of an n-BuLi hexane solution as a scavenger, an n-hexane solution containing 7.8 mmol of n-BuLi was loaded and polymerization was initiated. Copolymerization of 1,3-butadiene was carried out for 2.5 hours. During the polymerization, the stirring speed was 130 rpm, the temperature in the polymerization reactor was 70° C., and 780 g of 1,3-butadiene was continuously supplied. The obtained polymerization solution was then stirred at a speed of 130 rpm in the polymerization reactor while maintaining a reactor temperature of 70° C.

(Step 2)

After step 1, while maintaining a polymerization reactor temperature of 70° C., the obtained polymer solution was stirred at a speed of 130 rpm, 7.8 mmol of [3-(diethylamino)propyl]trimethoxysilane was added as a modifying agent to the polymerization solution, and stirring was continued for 15 minutes. After loading 5 mL of a hexane solution containing 0.5 mL of methanol into the polymerization reactor, the polymer solution was stirred for 5 minutes. Next, 5.2 g of "SUMILIZER GM" and 2.6 g of "SUMILIZER TP-D" were added, after which most of the volatile components in the polymer solution were vaporized off at ordinary temperature for 24 hours, and reduced pressure drying was carried out at 55° C. for 12 hours to obtain conjugated diene-based polymer C2.

Synthesis Example C3

(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of industrial hexane, 650 g of 1,3-butadiene, 350 g of styrene, 6.9 mL of tetrahydrofuran and 3.4 mL of ethyleneglycol diethyl ether were loaded in. After loading a small amount of an n-BuLi hexane solution as a scavenger into the polymerization reactor, an n-hexane solution containing 13.6 mmol of n-BuLi was loaded and polymerization was initiated. Copolymerization of 1,3-butadiene and styrene was carried out for 2.7 hours. During the polymerization, the stirring speed was 130 rpm, the temperature in the polymerization reactor was 65° C., and 850 g of 1,3-butadiene and 150 g of styrene were continuously supplied. The obtained polymerization solution was then stirred at a speed of 160 rpm in the polymerization reactor while maintaining a reactor temperature of 65° C.

(Step 2)

After step 1, while maintaining a polymerization reactor temperature of 65° C., the obtained polymer solution was stirred at a speed of 160 rpm, 13.6 mmol of [3-(diethylamino)propyl]trimethoxysilane was added as a modifying agent to the polymerization solution, and stirring was continued for 15 minutes. After loading 5 mL of a hexane solution containing 0.8 mL of methanol, the polymer solution was stirred for 5 minutes. Next, 8.0 g of "SUMILIZER GM" and 4.0 g of "SUMILIZER TP-D" were added, after which most of the volatile components in the polymer solution were vaporized off at ordinary temperature for 24 hours, and reduced pressure drying was carried out at 55° C. for 12 hours to obtain conjugated diene-based polymer C3.

Synthesis Example C4

(Step 1)

A stirrer-mounted stainless steel polymerization reactor with an internal volume of 20 L was washed and dried, and the atmosphere in the interior of the polymerization reactor was exchanged with dry nitrogen. Next, 10.2 kg of industrial hexane, 706 g of 1,3-butadiene, 6 g of styrene, 6.1 mL of tetrahydrofuran and 9.7 mL of ethyleneglycol diethyl ether were loaded into the polymerization reactor. After loading a small amount of an n-BuLi hexane solution as a scavenger into the polymerization reactor, an n-hexane solution containing 10.5 mmol of n-BuLi was loaded and polymerization was initiated. Copolymerization of 1,3-butadiene and styrene was carried out for 2.5 hours. During the polymerization, the stirring speed was 160 rpm, the temperature in the polymerization reactor was 65° C., and 1058 g of 1,3-butadiene and 30 g of styrene were continuously supplied. The obtained polymerization solution was then stirred at a speed of 160 rpm in the polymerization reactor while maintaining a reactor temperature of 65° C.

(Step 2)

After step 1, while maintaining a polymerization reactor temperature of 65° C., the obtained polymer solution was stirred at a speed of 160 rpm, 10.5 mmol of [3-(diethylamino)propyl]trimethoxysilane was added as a modifying agent to the polymerization solution, and stirring was continued for 15 minutes. After loading 5 mL of a hexane solution containing 0.8 mL of methanol into the polymerization reactor, the polymer solution was stirred for 5 minutes. Next, 8.0 g of "SUMILIZER GM" and 4.0 g of "SUMILIZER TP-D" were added, after which most of the volatile components in the polymer solution were vaporized off at ordinary temperature for 24 hours, and reduced pressure drying was carried out at 55° C. for 12 hours to obtain conjugated diene-based polymer C4.

The evaluation results for the conjugated diene-based polymers of the Synthesis Examples are shown in Table 1.

TABLE 1

| Synthesis example | A1 | A2 | A3 | B1 | B2 | C1 | C2 | C3 | C4 |
|---|---|---|---|---|---|---|---|---|---|
| Styrene unit content (mass %) | 5 | 5 | 9 | 10 | 10 | 25 | 0 | 25 | 2 |
| Vinyl bonds (mol %) | 63 | 63 | 52 | 41 | 40 | 62 | 28 | 60 | 76 |
| Mooney viscosity | 44 | 50 | 45 | 68 | 39 | 65 | 37 | 43 | 39 |
| Mw | 260,000 | 490,000 | 260,000 | 560,000 | 250,000 | 450,000 | 280,000 | 230,000 | 270,000 |
| Tg (° C.) | −42 | −41 | −48 | −59 | −59 | −24 | −79 | −25 | −27 |
| SP value (MPa$^{1/2}$) | 16.91 | 16.91 | 17.06 | 17.14 | 17.14 | 17.36 | 17.01 | 17.37 | 16.76 |
| Height retention (%) | 92 | 99 | 75 | >99 | >99 | 99 | 54 | 99 | 95 |

<Preparation of Polymer Composition and Fabrication of Vulcanized Sheet>

The materials other than the sulfur and vulcanization accelerator were kneaded at 150° C. for 5 minutes with a Laboplastomill, in the mixing proportions (parts by weight) listed in Table 2, to prepare polymer compositions for the Examples and Comparative Examples. After adding the sulfur and vulcanization accelerator to each polymer composition, a 6-inch roll was used for molding of a sheet at 50° C., and the sheet was heated at 160° C. for 10 minutes for vulcanization, to fabricate a vulcanized sheet for each of the Examples and Comparative Examples.

The materials listed in Table 2 are the following.
Natural rubber (NR): "SIR20" (SP value: 17.00 MPa$^{1/2}$)
High-cis-butadiene rubber (high-cis BR): "UBEPOL BR150B" by Ube Industries, Ltd. (SP value: 17.18 MPa$^{1/2}$)
Silica: "Ultrasil VN3-GR", trade name of Evonik Co.
Oil: "JOMO Process NC-140", trade name of JXTG Energy
Silane coupling agent: "Si69" (bis(3-triethoxysilylpropyl) tetrasulfide), trade name of Evonik Co.
Zinc oxide: "Zinc Oxide 2", trade name of Seido Chemical Industry Co., Ltd.
Age inhibitor: "ANTIGEN 3C", trade name of Sumitomo Chemical Co., Ltd.
Wax: "SUNNOC N", trade name of Ouchi Shinko Chemical Industrial Co., Ltd.
Stearic acid: "Stearic Acid 50S", trade name of New Japan Chemical Co., Ltd.
Vulcanization accelerator (1): "SOXINOL CZ", trade name of Sumitomo Chemical Co., Ltd.
Vulcanization accelerator (2): "SOXINOL D", trade name of Sumitomo Chemical Co., Ltd.
Sulfur: "Fine Powdered Sulfur 200 Mesh", trade name of Tsurumi Chemical Industry Co., Ltd.

Table 2 shows the evaluation results for the low-temperature performance of the vulcanized sheets obtained in the Examples and Comparative Examples. The low-temperature performances are relative values with respect to 100 as the E' value for Comparative Example 1, with a smaller value signifying more excellent on-ice performance when used in a studless tire.

TABLE 2

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Conjugated diene-based polymer A1 | — | 10 | — | — | 10 | — | — | — | — | — |
| Conjugated diene-based polymer A2 | 10 | — | — | 10 | — | — | — | — | — | — |
| Conjugated diene-based polymer A3 | — | — | 10 | — | — | — | — | — | — | — |
| Conjugated diene-based polymer B1 | — | — | — | 10 | — | — | — | — | — | 10 |
| Conjugated diene-based polymer B2 | — | — | — | — | 10 | — | — | — | — | — |
| Conjugated diene-based polymer C1 | — | — | — | — | — | — | 10 | — | — | 10 |
| Conjugated diene-based polymer C3 | — | — | — | — | — | — | — | 10 | — | — |
| Conjugated diene-based polymer C4 | — | — | — | — | — | — | — | — | 10 | — |
| NR | 50 | 50 | 50 | 40 | 40 | 60 | 50 | 50 | 50 | 40 |
| High-cis BR | 40 | 40 | 40 | 40 | 40 | 40 | 40 | 40 | 40 | 40 |
| Silica | 50 | 50 | 50 | 50 | 50 | 50 | 50 | 50 | 50 | 50 |
| Oil | 10 | 10 | 10 | 10 | 10 | 10 | 10 | 10 | 10 | 10 |
| Silane coupling agent | 4 | 4 | 4 | 4 | 4 | 4 | 4 | 4 | 4 | 4 |
| Zinc oxide | 3 | 3 | 3 | 3 | 3 | 3 | 3 | 3 | 3 | 3 |
| Age inhibitor | 1 | 1 | 1 | 1 | 1 | 1 | 1 | 1 | 1 | 1 |
| Wax | 2 | 2 | 2 | 2 | 2 | 2 | 2 | 2 | 2 | 2 |
| Stearic acid | 3 | 3 | 3 | 3 | 3 | 3 | 3 | 3 | 3 | 3 |
| Vulcanization accelerator (1) | 1 | 1 | 1 | 1 | 1 | 1 | 1 | 1 | 1 | 1 |
| Vulcanization accelerator (2) | 1.5 | 1.5 | 1.5 | 1.5 | 1.5 | 1.5 | 1.5 | 1.5 | 1.5 | 1.5 |
| Sulfur | 1 | 1 | 1 | 1 | 1 | 1 | 1 | 1 | 1 | 1 |
| Low-temperature performance | 96 | 93 | 96 | 91 | 85 | 100 | 101 | 102 | 104 | 100 |

What is claimed is:

1. A conjugated diene-based polymer comprising an aromatic vinyl unit based on an aromatic vinyl compound and a conjugated diene unit based on a conjugated diene compound, wherein
the conjugated diene-based polymer is modified with a compound containing a heteroatom and has an SP value of 16.80 MPa$^{1/2}$ to 17.10 MPa$^{1/2}$,
an amount of vinyl bonds of the conjugated diene-based polymer is 45 mol % to 80 mol %, where 100 mol % is the content of the conjugated diene unit,
a glass transition temperature of the conjugated diene-based polymer is −70° C. to −30° C.,
the compound containing a heteroatom is selected from the group consisting of acrylamide compounds, vinylsilane compounds, alkoxysilane compounds, polysiloxane compounds, silane sulfide compounds, sulfanylsilane compounds, cyanate compounds and polyimine compounds,
wherein the vinylsilane compound is selected from the group consisting of bis(dimethylamino)methylvinylsilane, bis(diethylamino)methylvinylsilane, bis(n-propylamino)methylvinylsilane, bis(di(n-butyl)amino)methylvinylsilane, bis(dimethylamino)ethylvinylsilane, bis(diethylamino)ethylvinylsilane, bis(dipropylamino)ethylvinylsilane and bis(dibutylamino)ethylvinylsilane.

2. The conjugated diene-based polymer according to claim 1, wherein the aromatic vinyl unit content is no greater than 10 mass % with respect to the total amount of the conjugated diene unit and the aromatic vinyl unit.

3. The conjugated diene-based polymer according to claim 1, wherein the compound containing a heteroatom is at least one selected from the group consisting of an alkoxysilane compound containing an amino group and the vinylsilane compound containing an amino group.

4. The conjugated diene-based polymer according to claim 1, wherein the amount of vinyl bonds of the conjugated diene-based polymer is 45 mol % to 70 mol %.

5. The conjugated diene-based polymer according to claim 1, wherein the aromatic vinyl unit content is no greater than 9 mass % with respect to the total amount of the conjugated diene unit and the aromatic vinyl unit.

6. A conjugated diene-based polymer composition comprising a polymer component that includes a conjugated diene-based polymer according to claim 1 and natural rubber, and a filler.

7. The conjugated diene-based polymer composition according to claim 6, wherein the polymer component further includes high-cis-butadiene rubber.

8. The conjugated diene-based polymer composition according to claim 7, wherein the polymer component further includes a second conjugated diene-based polymer, the second conjugated diene-based polymer has an SP value of greater than 17.10 MPa$^{1/2}$ and no greater than 17.30 MPa$^{1/2}$, and the second conjugated diene-based polymer is neither the natural rubber nor the high-cis-butadiene rubber.

9. A conjugated diene-based polymer composition comprising a polymer component that includes a conjugated diene-based polymer according to claim 2 and natural rubber, and a filler.

10. The conjugated diene-based polymer composition according to claim 9, wherein the polymer component further includes high-cis-butadiene rubber.

11. The conjugated diene-based polymer composition according to claim 10, wherein the polymer component further includes a second conjugated diene-based polymer, the second conjugated diene-based polymer has an SP value of greater than 17.10 MPa$^{1/2}$ and no greater than 17.30 MPa$^{1/2}$, and the second conjugated diene-based polymer is neither the natural rubber nor the high-cis-butadiene rubber.

12. A method for producing the conjugated diene-based polymer according to claim 1, the method comprising:
a step of polymerizing a monomer including the aromatic vinyl compound and the conjugated diene compound in a hydrocarbon solvent in the presence of an alkali metal catalyst, to obtain a polymer, and
a step of modifying the polymer with the compound containing a heteroatom.

13. A method for producing the conjugated diene-based polymer according to claim 2, the method comprising:
a step of polymerizing a monomer including the aromatic vinyl compound and the conjugated diene compound in a hydrocarbon solvent in the presence of an alkali metal catalyst, to obtain a polymer, and
a step of modifying the polymer with the compound containing a heteroatom.

* * * * *